United States Patent Office
3,366,623
Patented Jan. 30, 1968

3,366,623
MONOAZO DYESTUFF PIGMENTS
Karl Ronco, Riehen, Switzerland, assignor to Ciba Limited, Basel, Switzerland, a company of Switzerland
No Drawing. Filed Mar. 15, 1965, Ser. No. 439,937
Claims priority, application Switzerland, Mar. 20, 1964, 3,621/64
6 Claims. (Cl. 260—203)

ABSTRACT OF THE DISCLOSURE

Monoazo dyestuff pigments of the formula (1)
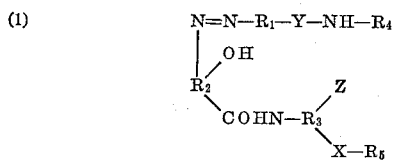

in which $R_1$ is a benzene radical containing a nitro group in ortho-position to the azo group, $R_2$ is a naphthalene radical in which the azo, hydroxy and carboxylic acid amide groups are in 1, 2, 3-position, $R_3$ is a benzene radical, $R_4$ and $R_5$ are aryl radicals, for example, naphthalene radicals, especially benzene radicals, X is a carboxylic acid or sulfonic acid amide group, Y is a —CO— or an —SO$_2$— group and Z is a hydrogen atom or a group of the formula —X—$R_5$.

---

The present invention provides monoazo dyestuff pigments of the formula (1)
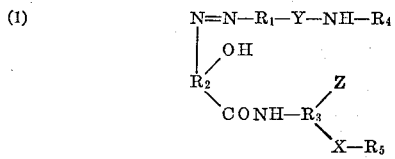

in which $R_1$ represents a benzene radical containing a nitro group in ortho-position to the azo group, $R_2$ represents a naphthalene radical in which the azo, hydroxy and carboxylic acid amide groups are in 1, 2, 3-position, $R_3$ represents a benzene radical, $R_4$ and $R_5$ represent aryl radicals, for example, naphthalene radicals, but especially benzene radicals, X represents a carboxylic acid or sulfonic acid amide group, Y represents a —CO— or an —SO$_2$— group and Z represents a hydrogen atom or a group of the formula —X—$R_5$.

Since the dyestuffs of the invention are to be in the form of pigments, they must not contain groups imparting solubility in water, especially acidic groups imparting solubility in water, for example, sulfonic acid or carboxylic acid groups.

The new dyestuffs may be obtained when (a) an azo dyestuff monocarboxylic acid halide free from acidic groups imparting solubility in water and corresponding to the formula (2)
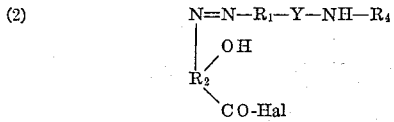

in which $R_1$, $R_4$ and Y have the meanings given above and $R_2$ represents a naphthalene radical in which the azo, hydroxy and carboxylic acid halide groups are in 1, 2, 3-position, is condensed with a monoamine free from acidic groups imparting solubility in water and corresponding to the formula (3)

in which $R_3$, $R_5$, X and Z have the meanings given above, or (b) an azo dyestuff monocarboxylic acid halide free from acidic groups imparting solubility in water and corresponding to the formula (4)
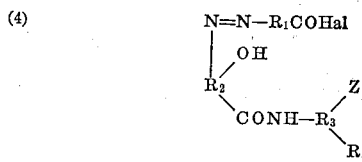

is condensed with an arylamine free from acidic groups imparting solubility in water, especially an aminobenzene, or (c) an azo dyestuff dicarboxylic acid halide free from acidic groups imparting solubility in water and corresponding to the formula (5)
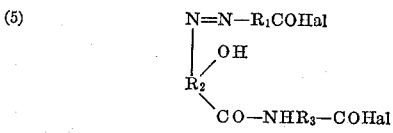

is condensed in a molar ratio of 1:2 with an arylamine, or (d) a diazo compound of an amine of the formula (6) $\quad H_2N—R_1—Y—NH—R_4$ is coupled with a naphthol of the formula (7)
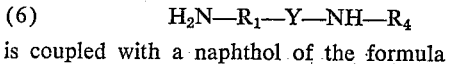

or (e) a diazo compound of an amine of the formula (8) $\quad H_2N—R_1—Y—NH—R_4$ is coupled with a naphthol of the formula (9)
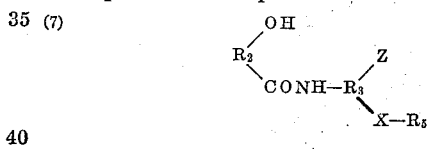

in which A represents the radical of an amine and $R_2$, $R_3$, $R_5$, X and Z have the meanings given above.

In method (a) of the process of the invention the starting materials used are advantageously azo dyestuff carboxylic acid chlorides of the formula

(10)
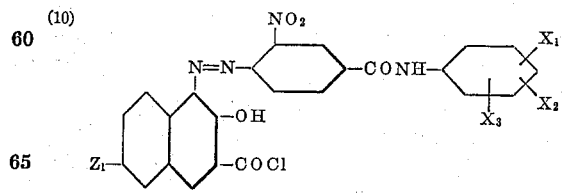

in which $X_1$, $X_2$ and $X_3$ represent hydrogen or halogen atoms or alkyl, alkoxy, trifluoromethyl, cyano or carbalkoxy groups and $Z_1$ represents a hydrogen or halogen atom or an alkoxy group.

The corresponding azo dyestuff carboxylic acids are obtainable by coupling a diazo compound of an amine of the formula

(11) 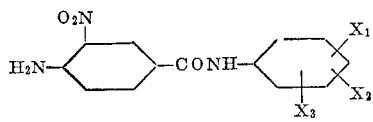

in which $X_1$, $X_2$ and $X_3$ have the meanings given above, with a 2:3-hydroxynaphthoic acid of the formula

(12) 

in which $Z_1$ represents a hydrogen or halogen atom or an alkoxy group.

The amines of the Formula 11 are advantageously obtained by condensing 1-formylamino-2-nitrobenzene-4-carboxylic acid chloride with an aminobenzene, for example, with aniline, 3- or 4-chloraniline,
2:5-dichloraniline,
2:4:5-trichloraniline,
4-bromaniline,
2-, 3- or 4-methylaniline,
2:5- or 2:6-dimethylaniline,
2-chloro-5-methylaniline,
2:3- or 4-methoxyaniline,
2-methoxy-5-methylaniline,
2:4-dimethyl-5-chloraniline,
2-methoxy-5-chloraniline,
2:5-dimethoxy-4-chloraniline,
2-methoxy-5-methyl-4-chloraniline,
3-trifluoromethylaniline,
3:5-bis-trifluoromethylaniline,
2-chloro-5-trifluoromethylaniline,
4-cyanoaniline,
3- or 4-carbomethoxyaniline,
2-chloro-5-carbomethoxyaniline,
2:5-bis-carbomethoxyaniline,
4-chloro-2:5-dimethoxyaniline,
5-chloro-2:4-dimethoxyaniline,
2-methoxy-5-trifluoromethylaniline,
4-acetylamino-3-trifluoromethylaniline or
2:5-dimethylaniline and then splitting off the formyl group in the condensation product obtained.

Conversion of the azo dyestuff carboxylic acids into their acid halides, for example, chlorides or bromides, is carried out, for example, with phosphorus halides, for example, phosphorus trichloride, phosphorus pentachloride or phosphorus pentabromide, phosphorus oxychloride or preferably with thionyl chloride.

The treatment with acid halogenating agents of the kind defined is advantageously carried out in an inert organic solvent, for example, dimethylformamide, a chlorobenzene, for example, monochlorobenzene or dichlorobenzene, toluene, xylene or nitrobenzene, if necessary, with the addition of dimethylformamide when using the last five solvents named.

When preparing the carboxylic acid halides it is generally advantageous to dry the azo compound if it has been prepared in aqueous medium, or to free it from water by azeotropic distillation in an organic solvent. If desired, said azeotropic drying may be effected immediately before the treatment with the acid halogenating agent.

The azo dyestuff carboxylic acid chlorides so obtained are condensed with monoamines of the Formula 3, especially with those of the formulae

(13) 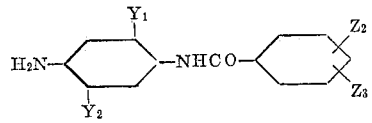

(14) 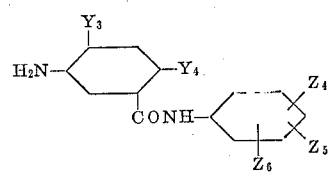

(15) 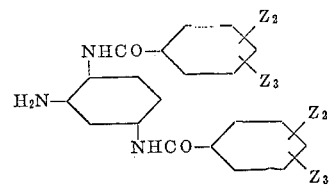

and

(16) 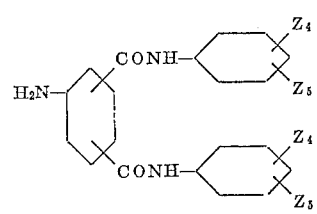

in which formulae X has the meaning given above, $Y_1$ represents a hydrogen or a halogen atom or an alkyl group, $Y_2$ represents a hydrogen or halogen atom or an alkyl or alkoxy group, $Y_3$ represents a hydrogen or halogen atom or an alkyl, alkoxy or aliphatic acylamino group, $Y_4$ represents a hydrogen or halogen atom or an alkoxy group, $Z_2$ and $Z_3$ represent hydrogen or halogen atoms or alkyl, alkoxy, phenyl, carbalkoxy, cyano or aliphatic acylamino groups, $Z_4$ and $Z_5$ represent hydrogen or halogen atoms or alkyl, alkoxy, nitro trifluoromethyl, cyano, carboxylic acid amide or carboxylic acid ester groups and $Z_6$ represents a hydrogen or halogen atom or an alkyl, alkoxy, carboxylic acid amide, carboxylic acid ester or benzoylamino group.

As examples of amines of the Formula 13 there may be mentioned:

4-benzoylamino-aniline,
2:5-dichloro-4-benzoylamino-aniline,
2:5-dichloro-4-(4'-chlorobenzoylamino)-aniline,
2:5-dichloro-4-(2':4'-dichlorobenzoylamino)-aniline,
2:5-dichloro-4-(2':5'-dichlorobenzoylamino)-aniline,
2:5-dichloro-4-(4'-methylbenzoylamino)-aniline,
2:5-dichloro-4-(4'-phenylbenzoylamino)-aniline,
2:5-dimethyl-4-benzoylamino-aniline,
2:5-dimethyl-4-(4'-chlorobenzoylamino)-aniline,
2:5-dimethyl-4-(2':4'-dichlorobenzoylamino)-aniline,
2:5-dimethyl-4-(2':5'-dichlorobenzoylamino)-aniline,
2:5-dimethyl-4-(4'-methylbenzoylamino)-aniline,
2:5-dimethyl-4-(4'-phenylbenzoylamino)-aniline,
2:5-dimethyl-4-(4'-methoxybenzoylamino)-aniline,
2-chloro-5-methyl-4-benzoylamino-aniline,
2-chloro-5-methyl-4-(4'-chlorobenzoylamino)-aniline,
2-chloro-5-methyl-4-(2':5'-dichlorobenzoylamino)-aniline,
2-chloro-5-methyl-4-(4'-methylbenzoylamino)-aniline,
2-chloro-5-methyl-4-(4'-phenylbenzoylamino)-aniline,
2-methoxy-5-chloro-4-(benzoylamino)-aniline,
2-methoxy-5-chloro-4-(4'-chlorobenzoylamino)-aniline,
2-methoxy-5-chloro-4-(2':5'-dichlorobenzoylamino)-aniline,
2-methoxy-5-chloro-4-(4'-methylbenzoylamino)-aniline,
2-methoxy-5-chloro-4-(4'-phenylbenzoylamino)-aniline,
4-(4'-carbomethoxy)-benzoylamino-aniline,
2:5-dichloro-4-(4'-carbethoxy)-benzoylamino-aniline, and
2:5-dimethyl-4-(4'-carbomethoxy)-benzoylamino-aniline.

As examples of amines of the Formula 14 there may be mentioned:

4-chloro-3-aminobenzoic acid-(2':5'-dichloro)-anilide,
4-methoxy-3-aminobenzoic acid-(2':5'-dichloro)-anilide,
4-chloro-3-aminobenzoic acid-(3'-trifluoromethyl)-anilide,
4-chloro-3-aminobenzoic acid-(2':5'-dimethyl-4'-chloro)-anilide,
5-amino-2:4-dichlorobenzoic acid-(3'-trifluoromethyl)-anilide,
4-chloro-3-aminobenzoic acid-(5'-trifluoromethyl-2'-chloro)-anilide,
4-methoxy-3-aminobenzoic acid-(5'-trifluoromethyl-2'-chloro)-anilide,
4-chloro-3-aminobenzoic acid-(5'-carbomethoxy-2'-chloro)-anilide,
4-methoxy-3-aminobenzoic acid-(5':8'-dichloro-α-naphthyl)-amide,
4-methoxy-3-aminobenzoic acid-(5'-carbomethoxy-'',-chloro)-anilide,
4-chloro-3-aminobenzoic acid-(2':5'-dimethyl-4'-chloro)-anilide,
4-chloro-3-aminobenzoic acid-(3':5'-ditrifluoromethyl)-anilide,
1-benzoylamino-4-(3'-amino)-benzoylaminobenzene,
1-benzoylamino-4-(4'-chloro-3'-amino)-benzoylaminobenzene, and
1:4-dichloro-2-benzoylamino-5-(4'-chloro-3'-amino)-benzoylaminobenzene.

As examples of amines of the Formula 15 there may be mentioned:

1-amino-2:5-dibenzoylaminobenzene,
1-amino-2:5-di-(parachlorobenzoylamino)-benzene,
1-amino-2:5-di-(2':4'-dichlorobenzoylamino)-benzene, and
1-amino-2:5-di-(4'-carbomethoxybenzoylamino)-benzene.

As examples of amines of the Formula 16 there may be mentioned:

aminoterephthalic acid dianilide,
aminoterephthalic acid-di-(para-chloranilide),
aminoterephthalic acid-bis-(2':5'-dichloranilide),
aminoterephthalic acid-di-(meta-trifluoromethylanilide),
aminoterephthalic acid-di-(α-naphthylamide),
1-amino-benzene-3:5-dicarboxylic acid dianilide,
1-amino-benzene-3:5-dicarboxylic acid-di-(para-chloranilide), and
aminoterephthalic acid-di-(para-methoxyanilide).

In method (b) of the process of the invention the starting materials advantageously used are carboxylic acid halides of the formula

(17)
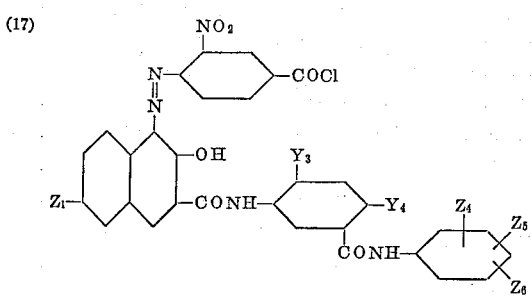

in which $Y_3$, $Y_4$, $Z_4$, $Z_5$ and $Z_6$ have the meaning given above. They are advantageously condensed with aminobenzenes of the formula

(18)
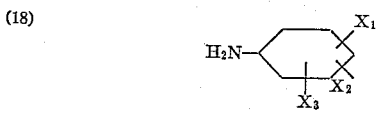

in which $X_1$, $X_2$ and $X_3$ have the meanings given above.

In method (c) of the process of the invention the starting materials advantageously used are dicarboxylic acid halides of the formula

(19)
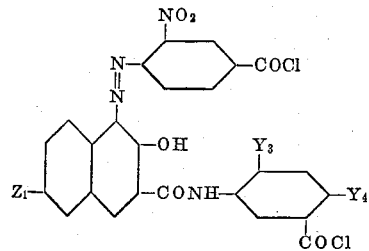

in which $Z_1$, $Y_3$ and $Y_4$ have the meanings given above. They are advantageously condensed with aminobenzenes of the Formula 18 in a molar ratio of 1:2.

Condensation between the carboxylic acid halides of the kind defined above and the amines is advantageously carried out in an anhydrous medium. Under such conditions it generally proceeds surprisingly quickly at the boiling temperatures of the common organic solvents, for example, toluene, monochlorobenzene, dichlorobenzene, trichlorobenzene, nitrobenzene and the like. In order to accelerate the reaction it is generally advantageous to add an agent capable of binding acid, for example, anhydrous sodium acetate or pyridine. Some of the dyestuffs so obtained are crystalline and some are amorphous, and they are generally obtained in a very good yield and in a pure state. It is advantageous first to isolate the acid chlorides which have been obtained from the carboxylic acids. In some cases, however, isolation of the acid chlorides can be omitted without harm, and condensation carried out immediately after the formation of the carboxylic acid chlorides.

In method (d) of the process of the invention for the production of the new dyestuffs, a diazo compound of an amine of the Formula 6, especially one of the Formula 11, may be coupled with a naphthol of the Formula 7.

Coupling is advantageously carried out in a manner such that an acidic solution of the diazonium salt is coupled continuously with an alkaline solution of the coupling component in a mixing nozzle, coupling taking place immediately. Care must be taken to ensure that the diazo component and coupling component are present in the mixing nozzle in equimolecular proportions. The simplest method of doing this is to control the pH value of the liquid in the mixing nozzle. It must also be ensured that the two solutions are violently agitated in the mixing nozzle. The dyestuff dispersion that is formed is drawn off from the mixing nozzle continuously and the dyestuff isolated by filtration.

In method (e) of the process of the invention for the production of the new dyestuffs, a diazo compound of an amine of the Formula 4 may be coupled with a naphthol of the Formula 9.

In the compounds of the Formula 9, A advantageously represents the radical of an amine of the formula

in which $R_6$ represents a hydrogen atom or an alkyl radical and $R_7$ represents an alkyl radical, the radicals $R_6$ and $R_7$ also being capable of forming a heterocyclic ring together with the nitrogen atom. As examples there may be mentioned the radicals of methylamine, dimethylamine, diethylamine, diethanolamine, pyrrolidine, piperidine and morpholine. The compounds of the Formula 9 are obtainable by reacting the compounds of the Formula 7 with formaldehyde and a primary or secondary amine.

During coupling, the radical —CH₂A is split off and replaced by the azo group. Coupling is advantageously carried out in an acid medium.

The new dyestuffs are valuable pigments that can be used for a very wide variety of purposes. For example, they can be used in a state of fine division for the spin-dyeing of filament and staple fibre viscose rayon, cellulose ethers and esters, polyamides, polyurethanes and polyesters, as well as in the preparation of colored lacquers and as lake formers. They can also be used for coloring solutions and products made from cellulose acetate, nitrocellulose, natural and synthetic resins, for example, polymerization and condensation resins, for example, aminoplasts, alkyd resins, phenoplasts, polyolefines, for example polystyrene, polyvinyl chloride, polyethylene, polypropylene, polyacrylonitrile, rubber, casein, silicones and silicone resins. They can also be used with advantage in the manufacture of colored pencils, cosmetic preparations and laminated sheet material.

The following examples illustrate the invention. Unless otherwise stated, the parts and percentages are by weight.

*Example 1*

108 parts of a dyestuff obtained by diazotising 4-amino-3-nitrobenzoic acid - (2′-chloro-5′-trifluoromethyl)-anilide with glacial acetic acid, hydrochloric acid and sodium nitrite and coupling with 2:3-hydroxynaphthoic acid, was mixed with 3,500 parts of ortho-dichlorobenzene, 4 parts of dimethylformamide and 32 parts of thionyl chloride and heated for 3 hours at 115 to 120° C. while stirring. After cooling the reaction mixture the mono-carboxylic acid chloride of the formula

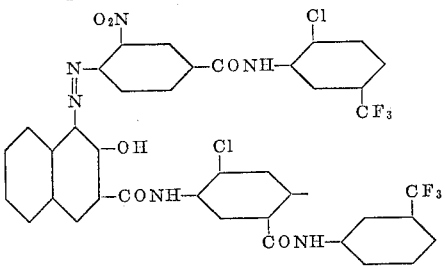

which precipitated in the form of irregular, needle-like crystals was isolated by filtration, washed with a small amount of cold ortho-dichlorobenzene and benzene and then dried in vacuo at 50 to 60° C. 9.5 parts of this monoazo dyestuff monocarboxylic acid chloride in admixture with 5.4 parts of 4-chloro-3-aminobenzoic acid-(3′-trifluoromethyl)-anilide in 350 parts of ortho-dichlorobenzene were heated for 12 hours at 140 to 145° C. Subsequently, the sparingly soluble pigment that precipitated in the form of thin, bent needles was isolated from the hot reaction mixture by filtration, washed with hot ortho-dichlorobenzene, methanol and hot water and then dried in vacuo at 70 to 80° C. The dyestuff so obtained, which corresponded to the formula

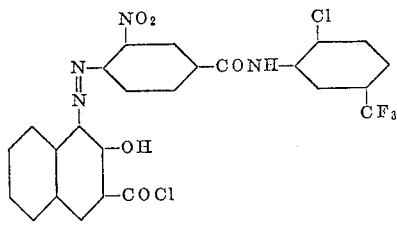

was an orange pigment sparingly soluble to insoluble in the common solvents and colored polyvinyl chloride film brilliant orange tints possessing an excellent fastness to light and migration.

The monoazo dyestuff monocarboxylic acids obtainable from the binuclear diazo components listed in column I and the coupling components listed in column II of the following table can be reacted in the manner described in the first and second paragraphs above via the monoazo dyestuff monocarboxylic acid chlorides with 1 mol of the aromatic monoamines listed in column III. The tints produced in polyvinyl chloride film with the pigments thus obtained are given in column IV.

| | I | II | III | IV |
|---|---|---|---|---|
| 1 | 4-amino-3-nitrobenzoic acid-(2′-chloro-5′-trifluoromethyl)-anilide. | 2:3-hydroxynaphthoic acid | 4-chloro-3-aminobenzoic acid-(4′-chloro)-anilide | Orange. |
| 2 | ___do___ | ___do___ | 4-chloro-3-aminobenzoic acid-(2′:5′-dichloro)-anilide. | Do. |
| 3 | ___do___ | ___do___ | 5-amino-2:4-dichlorobenzoic acid-(2′:5′-dichloro)-anilide. | Do. |
| 4 | ___do___ | ___do___ | 4-methoxy-3-aminobenzoic acid-(2′:5′-dichloro)-anilide. | Do. |
| 5 | ___do___ | ___do___ | 4-methoxy-3-aminobenzoic acid-(3′-trifluoromethyl)-anilide. | Do. |
| 6 | ___do___ | ___do___ | 2-amino-1:4-diacetylaminobenzene | Do. |
| 7 | ___do___ | ___do___ | 5-aminoisophthalic acid-di-(4′-chlorophenyl-amide). | Do. |
| 8 | ___do___ | ___do___ | 2-amino-1:4-di-(4′-chlorobenzoylamino)-benzene | Do. |
| 9 | ___do___ | ___do___ | 2:5-dichloro-4-(4′-chloro-3′-amino)-benzoyl-amino-1-benzoylaminobenzene. | Do. |
| 10 | ___do___ | ___do___ | 2:5-dichloro-4-(4′-methoxy-3′-amino)-benzoyl-amino-1-benzoylaminobenzene. | Do. |
| 11 | ___do___ | ___do___ | 2:5-dichloro-4-(4′-chloro-3′-amino)-benzoyl-amino-1-(4″-chloro)-benzoylaminobenzene. | Do. |
| 12 | ___do___ | ___do___ | 2:5-dichloro-4-(5′-amino-2′:4′-dichloro)-benzoyl-amino-1-(4″chloro)-benzoylaminobenzene | Do. |
| 13 | 4-amino-3-nitrobenzoic acid-(3′-trifluoromethyl)-anilide. | ___do___ | 2:4:5-trichloro-(4′-methoxy-3′-amino)-benzoyl-aminobenzene. | Do. |
| 14 | ___do___ | ___do___ | 3-trifluoromethyl-(4′-methyl-3′-amino)-benzoyl-aminobenzene. | Do. |
| 15 | ___do___ | ___do___ | 3-trifluoromethyl-(4′-methylmercapto-3′-amino)-benzoylaminobenzene. | Do. |
| 16 | ___do___ | ___do___ | 2:5-dichloro-(4′-methoxy-3′-amino)-benzoyl-aminobenzene. | Do. |
| 17 | ___do___ | ___do___ | 2:5-dimethyl-4-chloro-(4′-chloro-3′-amino)-benzoylaminobenzene. | Do. |
| 18 | ___do___ | ___do___ | 2:5-dichloro-(4′-chloro-3′-amino)-benzoyl-aminobenzene. | Do. |
| 19 | ___do___ | ___do___ | 3-trifluoromethyl-(4′-chloro-3′-amino)-benzoyl-aminobenzene. | Do. |
| 20 | ___do___ | ___do___ | 3-trifluoromethyl-(4′-methoxy-3′-amino)-benzoylaminobenzene. | Do. |
| 21 | ___do___ | ___do___ | 4-chloro-(4′-chloro-3′-amino)-benzoylamino-benzene. | Do. |
| 22 | ___do___ | ___do___ | 2:5-dichloro-(5′-amino-2′:4′-dichloro)-benzoyl-aminobenzene. | Do. |
| 23 | ___do___ | ___do___ | 2:5-dichloro-4-(4′-methoxy-3′-amino)-benzoyl-amino-1-benzoylaminobenzene. | Do. |
| 24 | ___do___ | ___do___ | 2-amino-1:4-diacetylaminobenzene | Do. |
| 25 | 4-amino-3-nitrobenzoic acid-(2′:5′-dichloro)-anilide. | ___do___ | 5:8-dichloro-(4′-methoxy-3′-amino)-benzoyl-aminonaphthalene. | Red. |
| 26 | ___do___ | ___do___ | 3-trifluoromethyl-(5′-amino-4′-methoxy-2′-chloro)-benzoylaminobenzene. | Orange. |

| | I | II | III | IV |
|---|---|---|---|---|
| 27 | ...do... | ...do... | 3-trifluoromethyl-(4'-methylmercapto-3'-amino)-benzoylaminobenzene. | Brown. |
| 28 | ...do... | ...do... | 2:5-dichloro-(5'-amino-2':4'-dichloro)-benzoylaminobenzene. | Orange. |
| 29 | ...do... | ...do... | 3-trifluoromethyl-(4'-methoxy-3'-amino)-benzoylaminobenzene. | Do. |
| 30 | ...do... | ...do... | 2-chloro-5-trifluoromethyl-(4'-methoxy-3'-amino)-benzoylaminobenzene. | Do. |
| 31 | ...do... | ...do... | 1-(4'-methoxy-3'-amino)-benzoylaminonaphthalene. | Do. |
| 32 | ...do... | ...do... | 2:5-dichloro-(4'-methoxy-3'-amino)-benzoylaminobenzene. | Do. |
| 33 | ...do... | ...do... | 2:4:5-trichloro-(4'-methoxy-3'-amino)-benzoylaminobenzene. | Do. |
| 34 | ...do... | ...do... | 3-trifluoromethyl-(5'-amino-2':4'-dichloro)-benzoylaminobenzene. | Do. |
| 35 | ...do... | ...do... | 2:5-dichloro-(4'-chloro-3'-amino)-benzoylaminobenzene. | Do. |
| 36 | ...do... | ...do... | 4-methoxy-3-aminobenzene-sulphonic acid-(2':5'-di-chloro)-phenylamide. | Red. |
| 37 | ...do... | ...do... | 2:5-dimethyl-4-(4'-chloro)-benzoylamino-1-aminobenzene. | Do. |
| 38 | ...do... | ...do... | 2:5-dichloro-4-(4'-chloro-3'-amino)-benzoylamino-1-benzoylaminobenzene. | Orange. |
| 39 | ...do... | ...do... | 2:5-dichloro-4-(4'-methoxy-3'-amino)-benzoylamino-1-benzoylaminobenzene. | Do. |
| 40 | ...do... | ...do... | 2-methoxy-4-benzoylamino-5-chloro-1-aminobenzene. | Brown. |
| 41 | ...do... | ...do... | 2:5-dichloro-4-(5'-amino-2':4'-dichloro)-benzoylamino-1-benzoylaminobenzene. | Red orange. |
| 42 | ...do... | ...do... | 2-aminoterephthalic acid diphenylamide. | Orange. |
| 43 | ...do... | ...do... | 2:5-dimethyl-4-(5'-amino-2':4'-dichloro)-benzoylamino-1-benzoylamino-benzene. | Do. |
| 44 | 4-amino-3-nitrobenzoic acid-(3':5'-ditrifluoromethyl)-anilide. | ...do... | 2:5-dichloro-4-(4'-chloroamino)-3'benzoylamino-1-benzoylamino-benzene. | Do. |
| 45 | ...do... | ...do... | 2-aminoterephthalic acid diphenylamide. | Yellow orange. |
| 46 | 4-amino-3-nitrobenzoic acid-(4'-chloro)-anilide. | ...do... | 2:5-dichloro-4-(4'-chloro)-benzoylamino-1-amino-benzene. | Brown. |
| 47 | 4-amino-3-nitrobenzoic acid-(2'-chloro-5'-trifluoromethyl)-anilide. | 6-bromo-2:3-hydroxynaphthoic acid. | 3-trifluoromethyl-(4'-chloro-3'-amino)-benzoylaminobenzene. | Orange. |
| 48 | ...do... | ...do... | 3-trifluoromethyl-(4'-methoxy-3'-amino)-benzoylaminobenzene. | Do. |
| 49 | 4-amino-3-nitrobenzoic acid-(2':5'-dichloro)-anilide. | ...do... | ...do... | Do. |
| 50 | ...do... | ...do... | 3-trifluoromethyl-(4'-chloro-3'-amino)-benzoylaminobenzene. | Do. |
| 51 | 4-amino-3-nitrobenzoic acid-(2'-chloro-5'-trifluoromethyl)-anilide. | ...do... | 2-amino-1:4-di-(4'-chlorobenzoylamino)-benzene. | Do. |
| 52 | 4-amino-3-nitrobenzenesulphonic acid-(3'-trifluoromethyl)-phenylamide. | ...do... | 2-aminoterephthalic acid diphenylamide. | Do. |
| 53 | ...do... | 6-methoxy-2:3-hydroxynaphthoic acid. | ...do... | Red-orange. |
| 54 | 4-amino-3-nitrobenzoic acid-(2'-chloro-5'-trifluoromethyl)-anilide. | ...do... | 3-trifluoromethyl-(4'-chloro-3'-amino)-benzoylaminobenzene. | Red. |
| 55 | 4-amino-3-nitrobenzene sulphonic acid-(3'-trifluoromethyl)-phenylamide. | 2:3-hydroxynaphthoic acid. | ...do... | Orange. |
| 56 | ...do... | ...do... | 2-aminoterephthalic acid diphenylamide. | Do. |
| 57 | ...do... | ...do... | 2:5-dichloro-4-(5'-amino-2':4'-dichloro)-benzoylamino-1-benzoylaminobenzene. | Do. |
| 58 | 4-amino-3-nitrobenzenesulphonic acid-(2':5'-dichloro)-phenylamide. | ...do... | ...do... | Do. |
| 59 | ...do... | ...do... | 2-aminoterephthalic acid diphenylamide. | Do. |
| 60 | ...do... | ...do... | 3-trifluoromethyl-(4'-methoxy-3'-amino)-benzoylaminobenzene. | Do. |
| 61 | 4-amino-3-nitrobenzoic acid-(2':5'-dichloro)-anilide. | ...do... | 2-chloro-5-trifluoromethyl-(4'-chloro-3'-amino)-benzoylaminobenzene. | Do. |
| 62 | ...do... | ...do... | 2-chloro-5-carbomethoxy-(4'-chloro-3'-amino)-benzoylaminobenzene. | Do. |
| 63 | ...do... | ...do... | 3:5-ditrifluoromethyl-(4'-methoxy-3'-amino)-benzoylaminobenzene. | Do. |
| 64 | ...do... | ...do... | 3-trifluoromethyl-(4'-methyl-3'-amino)-benzoylaminobenzene. | Do. |
| 65 | ...do... | ...do... | 2:5-dimethyl-4-chloro-(4'-chloro-3'-amino)-benzoylaminobenzene. | Do. |
| 66 | ...do... | ...do... | 3-trifluoromethyl-1-(5'-amino-4'-methoxy-2'-chloro)-benzoylaminobenzene. | Do. |
| 67 | ...do... | ...do... | 4-methoxy-3-aminobenzoic acid-α-naphthylamide. | Do. |
| 68 | ...do... | ...do... | 4-methoxy-3-aminobenzoic acid-β-naphthylamide. | Do. |
| 69 | ...do... | ...do... | 2:5-dimethyl-4-chloro-(4'-methoxy-3'-amino)-benzene. | Do. |
| 70 | ...do... | ...do... | 4-methoxy-3-aminobenzoic acid-α-5':8'-dichloronaphthylamide. | Red. |
| 71 | ...do... | ...do... | 3-chloro-(4'-methoxy-3'-amino)-(benzoyl-aminobenzene. | Orange. |
| 72 | ...do... | ...do... | 4-phenyl-(4'-methoxy-3'-amino)-benzoylaminobenzene. | Do. |
| 73 | ...do... | ...do... | 4-chloro-(4'-methoxy-3'-amino)-benzoylaminobenzene. | Do. |
| 74 | ...do... | ...do... | 4-acetylamino-(4'-methoxy-3'-amino)-benzoylaminobenzene. | Do. |
| 75 | ...do... | ...do... | 5-chloro-2-methyl-(4'-methoxy-3'-amino)-benzoylaminobenzene. | Do. |
| 76 | ...do... | ...do... | 5-chloro-2-methyl-(4'-chloro-3'-amino)-benzoylaminobenzene. | Do. |
| 77 | ...do... | ...do... | 2:5-dichloro-(4'-methyl-3'-amino)-benzoylaminobenzene. | Do. |
| 78 | ...do... | ...do... | 2-chloro-5-methyl-(4'-methyl-3'-amino)-benzoylaminobenzene. | Do. |
| 79 | ...do... | ...do... | 4-methyl-3-aminobenzoic acid anilide. | Do. |
| 80 | ...do... | ...do... | 5-amino-2:4-dichlorobenzoic acid anilide. | Do. |
| 81 | ...do... | ...do... | 3-carbomethoxy-(4'-chloro-3'-amino)-benzoylaminobenzene. | Do. |
| 82 | ...do... | ...do... | 5-carbomethoxy-2-methoxy-(4'-chloro-3'-amino)-benzoylaminobenzene. | Do. |

|   | I | II | III | IV |
|---|---|---|---|---|
| 83 | ___do___ | ___do___ | 3:5-ditrifluoromethyl-(4'-chloro-3'-amino)-benzoylaminobenzene. | Do. |
| 84 | 4-amino-3-nitrobenzoic acid-(4'-methoxy)-anilide. | ___do___ | 2:5-dichloro-(5'-amino-2':4'-dichloro)-benzoylaminobenzene. | Do. |
| 85 | 4-amino-3-nitrobenzoic acid-(2':5'-dimethoxy-4'-chloro)-anilide. | ___do___ | 2:5-dichloro-(5'-amino-2':4'-dichloro)-benzoylaminobenzene. | Red brown. |
| 86 | 4-amino-3-nitrobenzoic acid-(5'-chloro-2'-methoxy)-anilide. | ___do___ | 4-benzoylamino-1-aminobenzene. | Do. |
| 87 | ___do___ | ___do___ | 4-chloro-3-aminobenzoic acid anilide. | Orange. |
| 88 | ___do___ | ___do___ | 2:5-dichloro-(5'-amino-2':4'-dichloro)-benzoylaminobenzene. | Do. |
| 89 | ___do___ | ___do___ | 4-methoxy-3-aminobenzoic acid anilide. | Do. |
| 90 | 4-amino-3-nitrobenzoic acid-(3'-trifluoromethyl)-anilide. | ___do___ | 2,5-dichloro-4-(5'-amino-2',4'-dichloro)-benzoylaminobenzene. | Do. |

Example 2

13.5 parts of monoazo dyestuff obtained by diazotising 4-amino-3-nitrobenzoic acid with glacial acetic acid, hydrochloric acid and sodium nitrite and coupling with 4-chloro-3-(2'-hydroxy-3'-naphthoyl)-aminobenzoic acid-3''-trifluoromethyl-anilide, was mixed with 200 parts of ortho-dichlorobenzene, 0.3 part of dimethylformamide and 4.3 parts of thionyl chloride and heated for 3 hours at 115 to 120° C. while stirring. After cooling the reaction mixture, the monocarboxylic acid chloride of the formula

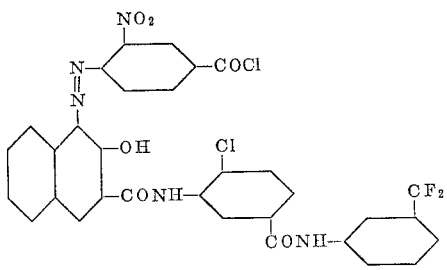

which precipitated in the form of regular, needle-like crystals, was isolated by filtration, washed with a small amount of ortho-dichlorobenzene and benzene and then dried in vacuo at 50 to 60° C. 1.39 parts of this monoazo dyestuff monocarboxylic acid chloride were heated for 12 hours at 140 to 145° C. in 150 parts of ortho-dichlorobenzene in admixture with 0.5 part of 3:5-di-(trifluoromethyl)-aniline. Subsequently, the crystalline, sparingly soluble pigment that precipitated was isolated from the hot reaction mixture by filtration, washed with hot ortho-dichlorobenzene, methanol and hot water and then dried in vacuo at 70 to 80° C. The dyestuff so obtained corresponding to the formula

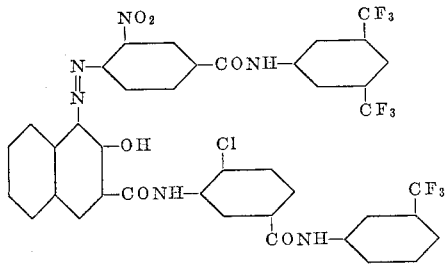

was an orange pigment sparingly soluble to insoluble in the common solvents and colored polyvinyl chloride film brilliant orange tints possessing an excellent fastness to light and migration.

The monoazo dyestuff monocarboxylic acids obtainable from the aminocarboxylic acid diazo component listed in column I of the following table and the coupling component listed in column II can be reacted in the manner described in the first paragraph above via the monoazo dyestuff monocarboxylic acid chloride with 1 mol of the aromatic monoamines listed in column III. The orange tints produced in polyvinyl chloride film with the pigments obtained displayed excellent properties of fastness.

|   | I | II | III |
|---|---|---|---|
| 1 | 4-amino-3-nitrobenzoic acid. | 4-chloro-3-(2'-hydroxy-3'-naphthoyl)-aminobenzoic acid-3''-trifluoromethylanilide. | 4-chloro-3-aminobenzoic acid methyl ester. |
| 2 | ___do___ | ___do___ | 3:5-di-trifluoromethylaniline. |
| 3 | ___do___ | ___do___ | 5-trifluoromethyl-2-chloraniline. |
| 4 | ___do___ | ___do___ | 3-trifluoromethylaniline. |
| 5 | ___do___ | ___do___ | 4-acetylaminoaniline. |
| 6 | ___do___ | ___do___ | 2:5-dichloraniline. |
| 7 | ___do___ | ___do___ | 2:4:5-trichloraniline. |

Example 3

22 parts of a monoazo dyestuff obtained by diazotising 4-amino-3-nitrobenzoic acid with glacial acetic acid, hydrochloric acid and sodium nitrite and coupling with 2-hydroxy-3-naphthoic acid-2'-chloro-5'-carboxyanilide, was mixed with 200 parts of ortho-dichlorobenzene, 0.5 part of dimethyl formamide and 13 parts of thionyl chloride and heated for 2 hours at 110 to 120° C. while stirring. After the reaction mixture, the crystalline dicarboxylic acid chloride of the formula

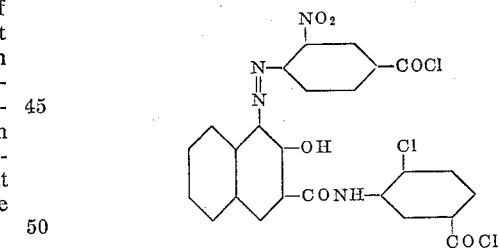

was isolated by filtration, washed with benezene and then dried in vacuo at 50° C. 16.4 parts of this monoazo dyestuff dicarboxylic acid chloride were heated for 12 hours at 140 to 145° C. in 700 parts of ortho-dichlorobenzene in admixture with 11 parts of 4-chloro-3-aminobenzoic acid methyl ester. The sparingly soluble pigment that precipitated was isolated from the hot reaction mixture by filtration, washed with hot ortho-dichlorobenzene, methanol and hot water and then dried in vacuo at 70 to 80° C. The dyestuff so obtained corresponding to the formula

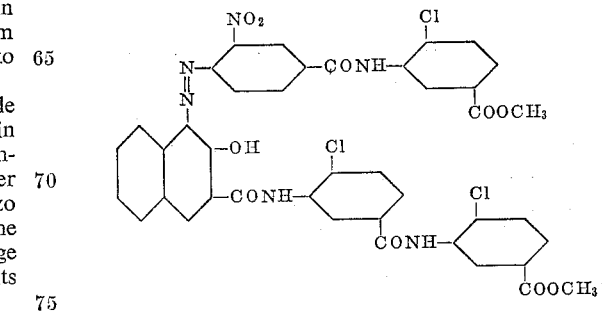

was an orange pigment sparingly soluble to insoluble in the common solvents. It colored polyvinyl chloride film brilliant orange tints possessing an excellent fastness to light and migration.

The monoazo dyestuff dicarboxylic acid obtainable from the diazo component listed in column I of the following table and the coupling component listed in column II can be reacted in the manner described in the first paragraph above via the carboxylic acid chloride with 2 mols of the aromatic monoamines listed in column III. The pigments obtained yielded orange tints possessing excellent properties of fastness in polyvinyl chloride film.

| | I | II | III |
|---|---|---|---|
| 1 | 4-amino-3-nitrobenzoic acid. | 2-hydroxy-3-naphthoic acid-2'-chloro-5'-carboxy-anilide. | 4-chloro-3-aminobenzoic acid methyl ester. |
| 2 | do | do | 3-trifluoromethylaniline. |
| 3 | do | do | 2:5-dichloraniline. |
| 4 | do | do | 5-trifluoromethyl-2-chloraniline. |

*Example 4*

32.6 parts of 3-nitro-4-aminobenzoic acid-(2':5'-dichloro)-anilide were suspended in 300 parts of glacial acetic acid; 30 parts of 30% hydrochloric acid were added and diazotizatioin carried out at 0 to 5° C. with 29 parts of 4 N sodium nitrite solution. After 30 minutes, the batch was diluted with 400 parts of ice-water, filtered, and the clear diazo solution run into a solution of 51 parts of 4-methoxy-3-(1'-dimethylamino-methyl - 2' - hydroxy-3'-naphthoylamino)-benzoic acid-(3''-trifluoromethylanilide) in 2,500 parts of water and 48 parts of 2 N hydrochloric acid at 10 to 15° C. The batch was then buffered to a pH value of 4.5 to 5 with a sodium acetate solution and stirred for 14 hours at 10 to 20° C. The batch was suction-filtered, the filter residue washed with water, suspended in 250 parts of 5 N hydrochloric acid, the suspension stirred for 1 hour at room temperature, filtered and the filter residue washed with dilute hydrochloric acid and water. The pigment was treated for 2 hours in a boiling water bath with 700 parts of pyridine, filtered hot, washed with pyridine, ethanol and hot water and then dried in vacuo at 70 to 80° C. A red-orange, soft-grained powder very sparingly soluble in organic solvents was obtained. It colored polyvinyl chloride film orange tints possessing a very good fastness to migration and light when incorporated in the said film on a roller mill. The pigment so obtained had the following formula

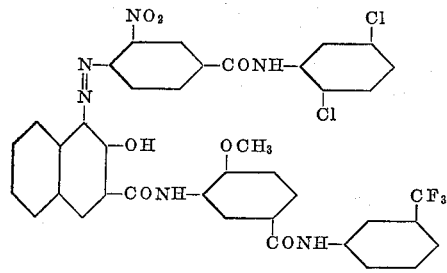

*Example 5*

32.6 parts of 3 - nitro - 4 - aminobenzoic acid-(2':5'-dichloranilide) were suspended in 100 parts of hot glacial acetic acid and the suspension run into 60 parts of 30% hydrochloric acid while stirring. The batch was diazotized at −5° C. with 25 parts of a 4 N sodium nitrite solution and then filtered until clear.

Meanwhile, 50.0 parts of 4-methoxy-3-(2'-hydroxy-3'-naphthoyl) - aminobenzoic acid-3''-trifluoromethylanilide were dissolved in a cold mixture of 50 parts of butanol, 200 parts of ethylene glycol monoethyl ether and 100 parts of 30% sodium hydroxide solution. The two solutions, if necessary, after dilution with water, were led continuously into a mixing nozzle so that the diazo component and coupling component were present in equimolecular proportions in said mixing nozzle. Coupling took place immediately. The pH value in the mixing nozzle was kept between 4.5 and 6 by regulating the supply of the solutions. The temperature was kept between 35 and 40° C. and could be regulated by the addition of water to the solutions. The dyestuff suspension that formed was filtered and the filter residue washed. The filter residue was then added to a mixture of 20 parts of water, 120 parts of ethylene glycol monoethyl ether and 100 parts of ortho-dichlorobenzene and the whole filtered at about 100° C. The filter residue was washed successively with Cellosolve, methanol and water and then dried in vacuo at 70 to 80° C. The dyestuff, which was obtained in a good yield, corresponded to product No. 29 in the table in respect of tint, purity, state of division and fastness properties.

The dyestuff was obtained in a specially fine state of division under favourable coupling conditions when an anionic or non-ionic wetting agent, for example, the sodium salt of N-benzyl-μ-heptadecylbenzimidazole disulfonic acid was added to the solution of the diazo component and/or the coupling component.

*Example 6*

A mixture was prepared from 65 parts of stabilized polyvinylchloride, 35 parts of dioctylphthalate and 0.2 part of the dyestuff obtained in the manner described in the second paragraph of Example 1, and said mixture worked to and fro for 7 minutes at 140° C. on a 2-roller mill. An orange film possessing a very good fastness to light and migration was obtained.

What is claimed is:
1. A monoazo dyestuff pigment of the formula

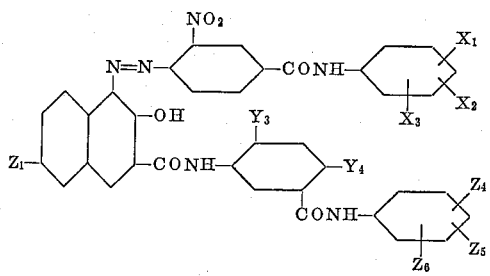

in which $X_1$, $X_2$, $X_3$ represent members selected from the group consisting of hydrogen and chlorine atoms, lower alkyl, lower alkoxy, trifluoromethyl, cyano, lower carbalkoxy and carbophenoxy groups. $Z_1$ is a member selected from the group consisting of hydrogen, chlorine and lower alkoxy, $Y_3$ represents a member selected from the group consisting of hydrogen and chlorine atoms, lower alkyl, lower alkoxy and carboxyphenylamide groups, $Y_4$ represents a member selected from the group consisting of hydrogen and chlorine atoms and lower alkoxy groups, $Z_4$ and $Z_5$ represent members selected from the group consisting of hydrogen, chlorine lower alkyl, lower alkoxy, phenoxy, nitro, trifluoromethyl, cyano, carboxamido, lower carbalkoxy and carbophenoxy groups, and $Z_6$ represents a member selected from the group consisting of hydrogen and chlorine atoms lower alkyl lower alkoxy groups, benzoylamino chloro benzoylamino carboxamido, lower carbalkoxy and carbophenoxy groups.

2. The dyestuff of the formula
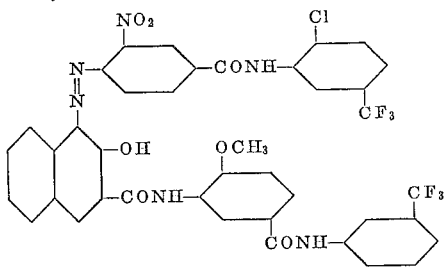
3. The dyestuff of the formula
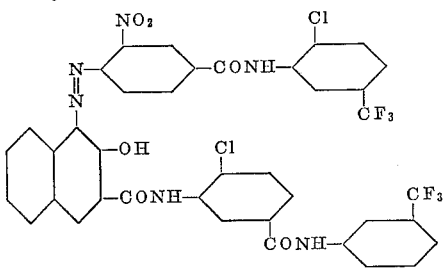
4. The dyestuff of the formula
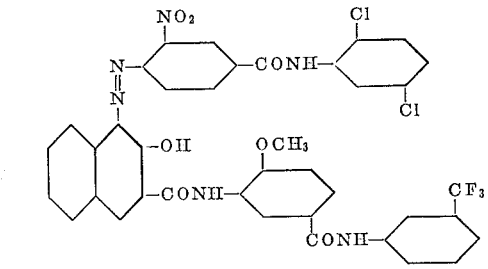
5. The dyestuff of the formula
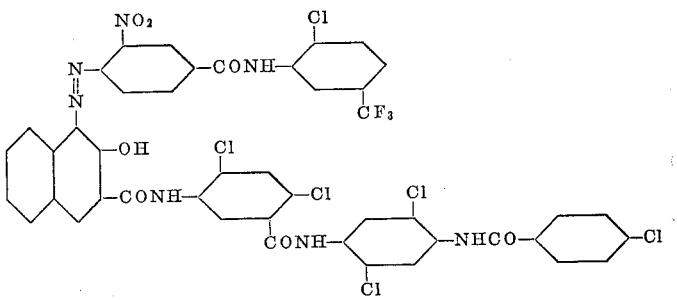
6. The dyestuff of the formula
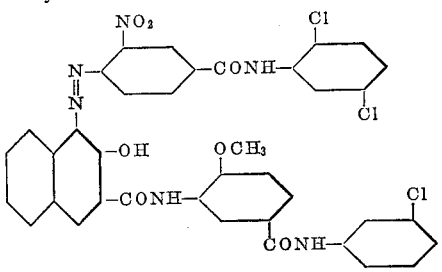
References Cited
UNITED STATES PATENTS
3,174,961  3/1965  Ronco _____ 260—203
CHARLES B. PARKER, *Primary Examiner.*
D. M. PAQUGA, *Assistant Examiner.*